US011218682B2

(12) United States Patent
Cole et al.

(10) Patent No.: US 11,218,682 B2
(45) Date of Patent: Jan. 4, 2022

(54) METHODS AND APPARATUS FOR PROCESSING AND OR ENCODING IMAGES WITH NEGATIVE PARALLAX

(71) Applicant: Nevermind Capital LLC, Wilmington, DE (US)

(72) Inventors: David Cole, Laguna Beach, CA (US); Alan McKay Moss, Laguna Beach, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

(21) Appl. No.: 15/002,224

(22) Filed: Jan. 20, 2016

(65) Prior Publication Data

US 2016/0212403 A1 Jul. 21, 2016

Related U.S. Application Data

(60) Provisional application No. 62/106,087, filed on Jan. 21, 2015.

(51) Int. Cl.
*H04N 13/00* (2018.01)
*H04N 13/161* (2018.01)
(Continued)

(52) U.S. Cl.
CPC ......... *H04N 13/161* (2018.05); *H04N 13/128* (2018.05); *H04N 13/144* (2018.05); *H04N 2013/0081* (2013.01)

(58) Field of Classification Search
CPC .. H04N 13/161; H04N 13/128; H04N 13/144; H04N 2013/0081
(Continued)

(56) References Cited

U.S. PATENT DOCUMENTS 8,345,751 B2 * 1/2013 Klein Gunnewiek ...................... H04N 19/597 348/51
8,542,909 B2 9/2013 Caceres et al.
(Continued)

FOREIGN PATENT DOCUMENTS

WO 2011028547 3/2011

OTHER PUBLICATIONS

International Search Report and Written Opinion of the International Searching Authority from International Application No. PCT/US 2016/014326, pp. 1-6, dated May 5, 2016.

*Primary Examiner* — Susan E. Hodges
(74) *Attorney, Agent, or Firm* — Blank Rome LLP

(57) ABSTRACT

Encoding and streaming methods and apparatus are described. Objects in negative parallax in frame pairs, e.g., pairs of left and right eye images forming a stereoscopic image, are identified. An amount of negative parallax reduction implemented depends, in some embodiments, on the data rate being used for encoding and/or the amount of negative parallax detected in the frame pair to be encoded. The lower the supported data rate the greater the reduction in negative parallax in some embodiments. In some, but not all, embodiments objects in positive parallax, e.g., objects appearing to go into the page, are not subject to parallax reduction. When a lowest supported data rate is used mono encoding is used and parallax reduction steps are skipped. The same frame pair is encoded multiple times at different data rates. Different amounts of negative parallax reduction are performed for at least some of the different supported data rates.

18 Claims, 10 Drawing Sheets

(51) Int. Cl.
*H04N 13/128* (2018.01)
*H04N 13/144* (2018.01)

(58) Field of Classification Search
USPC .......................................................... 348/43
See application file for complete search history.

(56) References Cited

U.S. PATENT DOCUMENTS

| | | | | |
|---|---|---|---|---|
| 8,948,531 | B2* | 2/2015 | Morifuji | G06T 9/00 |
| | | | | 382/239 |
| 9,313,474 | B1* | 4/2016 | Cole | H04N 19/00 |
| 9,313,475 | B2* | 4/2016 | Routhier | H04N 13/144 |
| 2011/0122131 | A1* | 5/2011 | Bruls | H04N 13/0022 |
| | | | | 345/419 |
| 2011/0122224 | A1* | 5/2011 | Lou | H04N 19/597 |
| | | | | 348/42 |
| 2012/0069162 | A1* | 3/2012 | Ota | H04N 9/8042 |
| | | | | 348/54 |
| 2012/0084652 | A1* | 4/2012 | Bauza | H04N 13/0007 |
| | | | | 715/719 |
| 2014/0104268 | A1 | 4/2014 | Lipton | |
| 2014/0125652 | A1* | 5/2014 | Raju | H04N 13/144 |
| | | | | 345/419 |

\* cited by examiner

METHODS AND APPARATUS FOR PROCESSING AND OR ENCODING IMAGES WITH NEGATIVE PARALLAX

RELATED APPLICATIONS

The present application claims the benefit of U.S. Provisional Patent Application Ser. No. 62/106,087 filed Jan. 21, 2015 which is hereby expressly incorporated by reference in its entirety.

FIELD

The present application related to stereoscopic image processing and encoding and, more particularly, methods and/or apparatus for supporting processing and encoding of stereoscopic images in a manner that supports streaming at a plurality of different data rates and/or a dynamically varying data rate with different amounts of applied negative parallax reduction corresponding to different data rates.

BACKGROUND

With stereoscopic images there are left and right eye views. Objects with negative parallax appear to be sticking out of the page and thus tend to appear closer to a viewer than objects with positive parallax, e.g., which appear going into the page. Objects going into a page or frame tend to appear further away than objects coming out of the frame in many cases. Thus objects with positive parallax often tend to appear to a viewer further away than objects with negative parallax.

The human expectation for objects which are far away is that they are likely to be poorly perceived due to distance and will often appear blurry. In contrast objects which the viewer perceives as being nearby are expected to appear clear with detail and clearly defined edges.

As a result of the basic human expectations, a human viewer, viewing a displayed stereoscopic image pair, tends to be less tolerant to blurry close up objects having a negative parallax than far away blurry objects having positive parallax. This is due in part, to the human expectation that close up objects near the viewer, such as many objects in negative parallax, should be easily and clearly seen with a fair amount of detail.

Close up blurry objects with large negative parallax tend to cause an unpleasant experience for a viewer, e.g. causing nausea, eyestrain, blurred vision, dizziness, headache and/or disorientation.

With high data rates it is often possible to maintain a large amount of detail and good image quality. At lower data rates image quality tends to be reduced as a result of loss of detail and edge information associated with many lossy encoding techniques used to support low bit rates. Thus, lower encoded data rates for stereoscopic images tend to cause image blur. Unfortunately in the case of objects in negative parallax this can cause unpleasant side effects.

In view of the above discussion, there is a need for new methods and apparatus to reduce the effects of negative parallax on a viewer when encoding is used on one or more frame pairs. It would be desirable if the methods and/or apparatus could take into consideration the data rate being used for encoding when making decisions with regard to what if any action should be taken with respect to negative parallax in frame pairs which are to be encoded.

SUMMARY

Methods and apparatus are described which determines the amount of negative parallax reduction to be applied to a stereoscopic image pair to be encoded as a function of data rate and/or resolution to be used for encoding and/or an identified object with negative parallax detected in the input image frame pair. While image quality is often tied to resolution, many content delivery systems support different levels of image quality for the same resolution with lower quality image content being delivered using lower data rates.

The amount of negative parallax a user can comfortably tolerate is often a function of image quality. For low quality image content, a user will often be able to tolerate a smaller amount of negative parallax in the displayed images than for higher quality, e.g., higher quality images.

Thus, data rate, like resolution, may be, and in some embodiments is, used as an indicator of the quality level to which images are being encoded. In accordance with the invention, a wider range of negative parallax is allowed for content being encoded at a first data rate, e.g., a high data rate, than when the same content is being encoded at a lower data rate, e.g., a second or third data rate lower than the first data rate.

In some embodiments the same content is encoded multiple times for different data rates to generate sets of encoded data which can be streamed to different devices which may not be able to support the same data rate. Thus, an encoded content stream can be selected based on the data rate a device can support, with devices which can receive and support lower data rate content being provided, in at least some embodiments, with encoded images with less negative parallax than devices supplied with higher data rate versions of the same encoded content.

Thus, in various embodiments an amount of negative parallax reduction to be applied to a frame pair prior to encoding is determined at least in part based on the data rate of the encoded content being generated.

In order to determine the maximum amount of negative parallax in a frame pair, objects over a predetermined size which appear in both the left and right eye images may be identified and the negative parallax for the identified objects determined. The maximum parallax for the frame pair is considered in some embodiments to be the largest negative parallax of any object above the predetermined size which appears in both the left and right eye images. Other techniques for determining the maximum negative parallax may be used but by taking into consideration the size of the object in the process, the amount of negative parallax of small objects which are not likely to be significant portions of the image pair and thus are likely to have little impact on a user, may be ignored.

Based on the determined maximum amount of negative parallax in an image and based on the data rate at which the image is being encoded, the amount of negative parallax reduction to be applied to the image pair is determined. Higher data rate versions of the same content which are being generated are subject to a lower amount of negative parallax reduction than lower data rate versions of the same content. Thus, for some content the maximum amount of negative parallax for images encoded at a high data rate is greater than is permitted for a lower data rate version of the same content.

Note that positive parallax, which is perceived as an image extending into the screen, tends not to cause sickening to the same degree as large amounts of negative parallax which is interpreted as an image extending out of the screen and close to the viewer's face. Thus, the constraint and reduction operation relates to negative parallax and not simply with respect to the overall difference or maximum amount of parallax.

In some embodiments, for the lowest encoding rate and thus low image quality and/or low resolution, mono encoding is used to avoid parallax altogether. Thus when mono, e.g., a single image is encoded rather than different left and right eye images, parallax is avoided altogether In some such embodiments, for higher encoding data rates stereo encoding is employed. Some image frame pairs, to be encoded using stereo encoding, are selected to undergo pre-encoding negative parallax reduction processing with the amount of pre-encoding negative parallax reduction being determined as a function of the data rate to be used for encoding, the identified object size, and/or a maximum negative parallax offset permitted. To reduce negative parallax the left and right eye images may be shifted by equal amounts prior to encoding in a way that reduces the maximum negative parallax between the two eye images.

With higher encoded data rates, e.g., corresponding to less blur with near object images, a human viewer can tolerate higher levels of negative parallax when viewing stereoscopic image pairs. Thus, in various embodiments, less negative parallax reduction is applied for a high encoded data rate than for a lower encoded data rate corresponding to the same input image pair. The same content may be, and sometimes is, encoded, e.g., differently, for multiple different data rates.

Various methods and apparatus, in accordance with the present invention, are well suited for applications in which real time or near real time processing is applied to an incoming stereoscopic image pair. In some such embodiments, the amount of negative parallax reduction applied is varied on a per frame basis, e.g., as a function of encoded data rate used, and identified objects with negative parallax. This dynamic variation with regard to negative parallax reduction levels allows for a user to view in 3D comfortably, e.g., without experiencing nausea.

An exemplary method of encoding stereoscopic image data, in accordance with some embodiments, includes: determining if a frame pair to be encoded includes an object in negative parallax; and determining, when a frame pair to be encoded includes an object in negative parallax, an amount of negative parallax reduction to be performed as a function of an encoding data rate to be used for encoding.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1A:
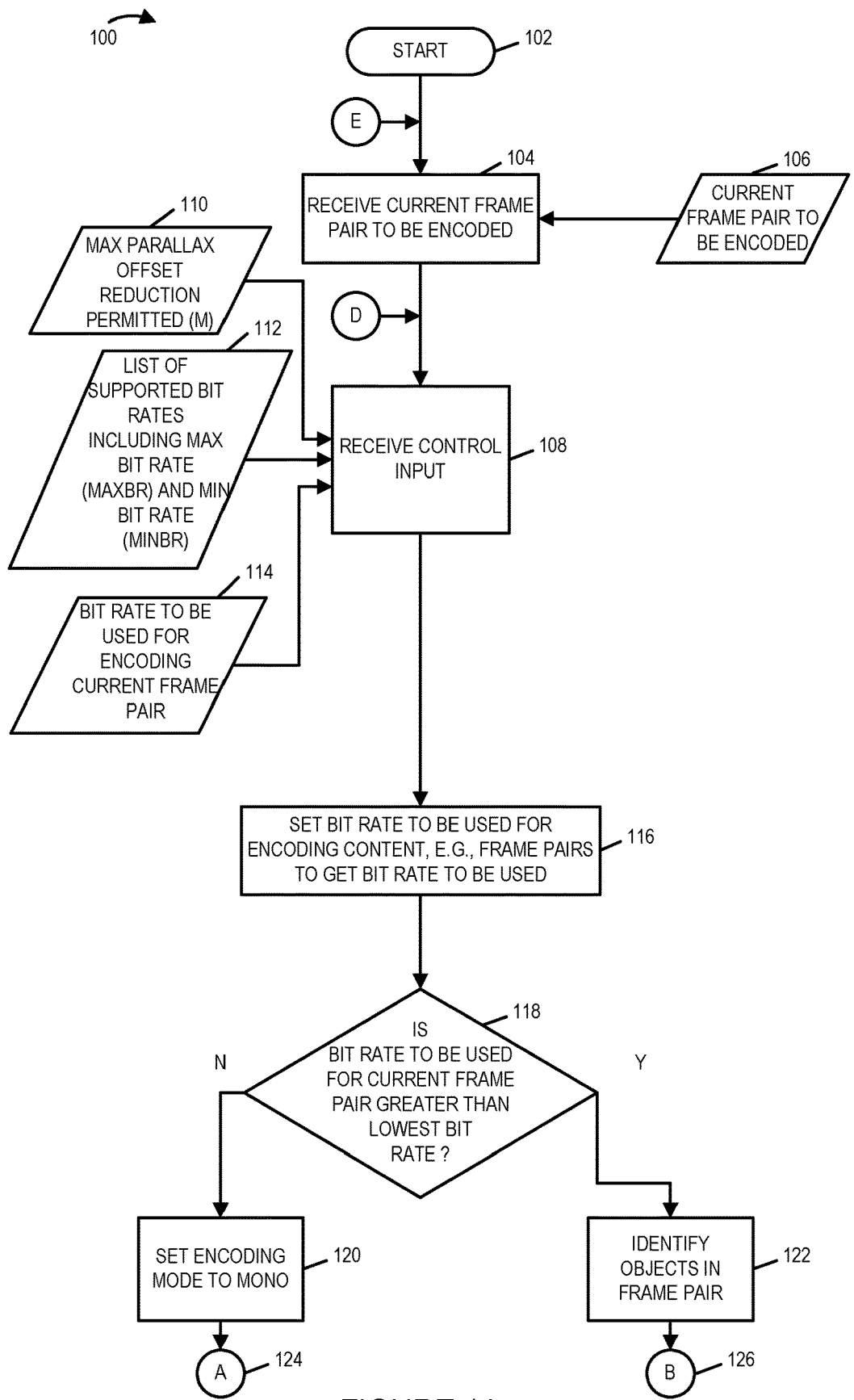
FIG. 1A is a first portion of a flowchart of an exemplary method of processing image data, e.g., stereoscopic frame pairs of image data, in accordance with an exemplary embodiment.
Figure 1B:
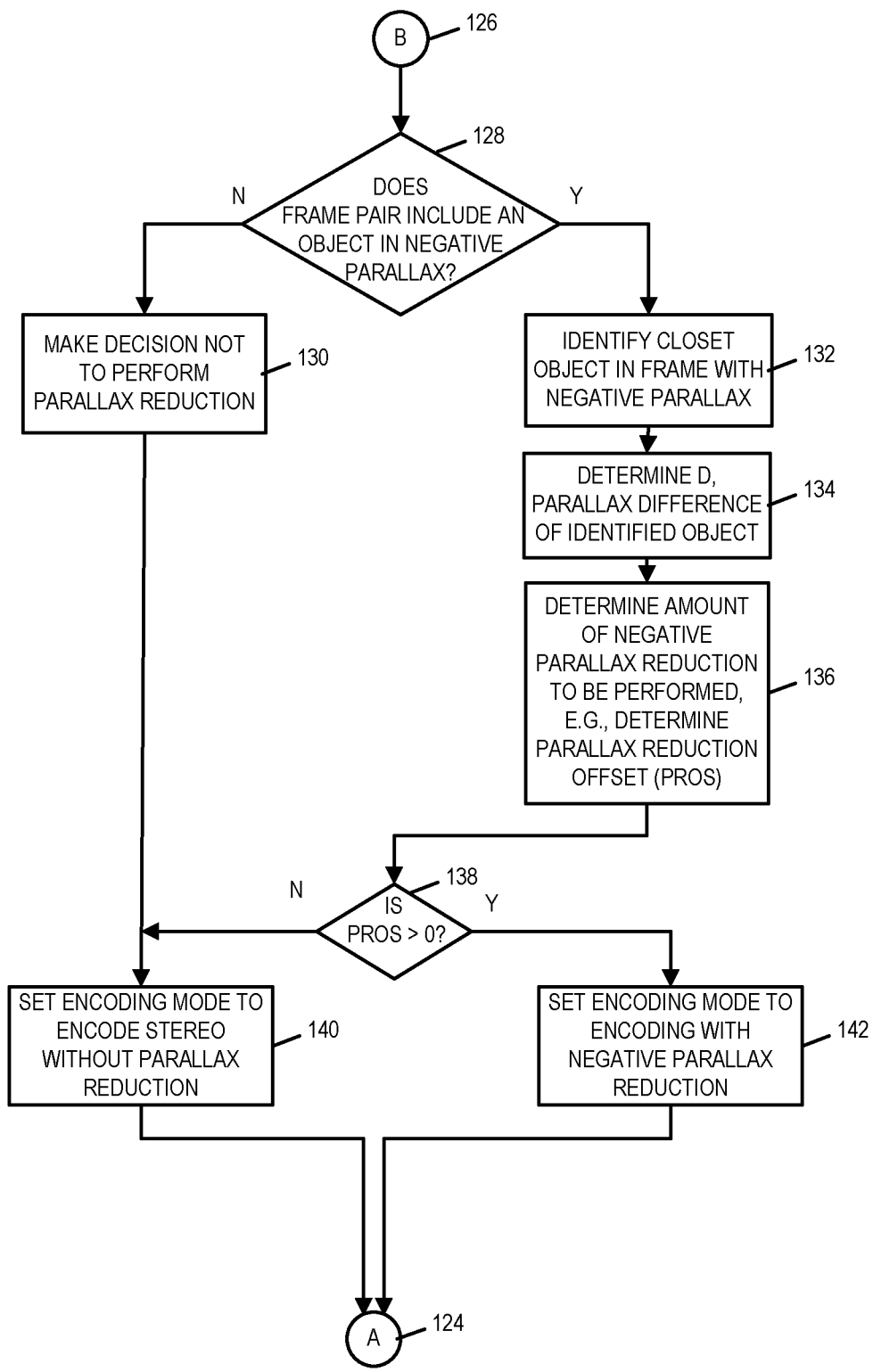
FIG. 1B is a second portion of a flowchart of an exemplary method of processing image data, e.g., stereoscopic frame pairs of image data, in accordance with an exemplary embodiment.
Figure 1C:
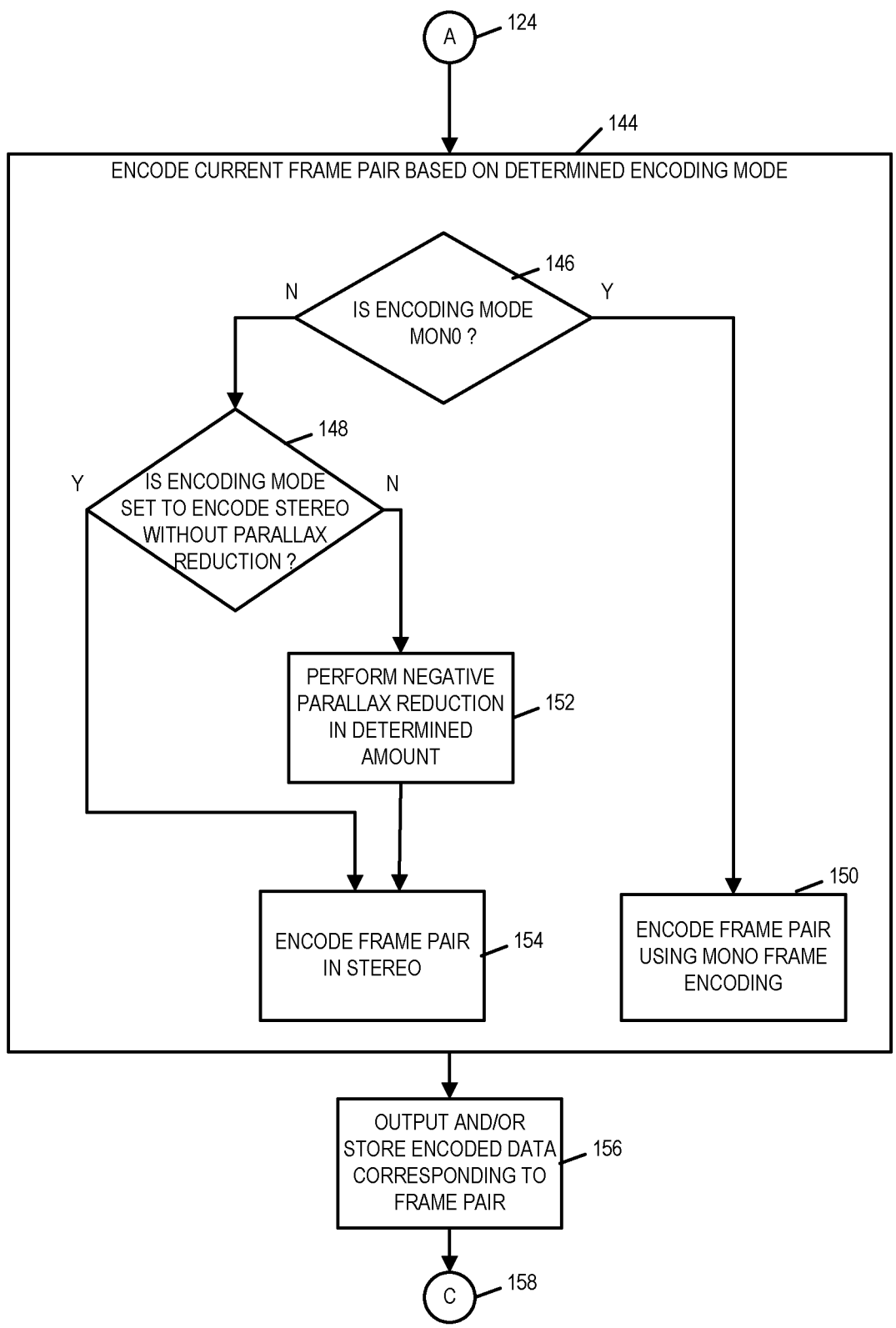
FIG. 1C is a third portion of a flowchart of an exemplary method of processing image data, e.g., stereoscopic frame pairs of image data, in accordance with an exemplary embodiment.
Figures 1, 1A, 1B, 1C, 1D:
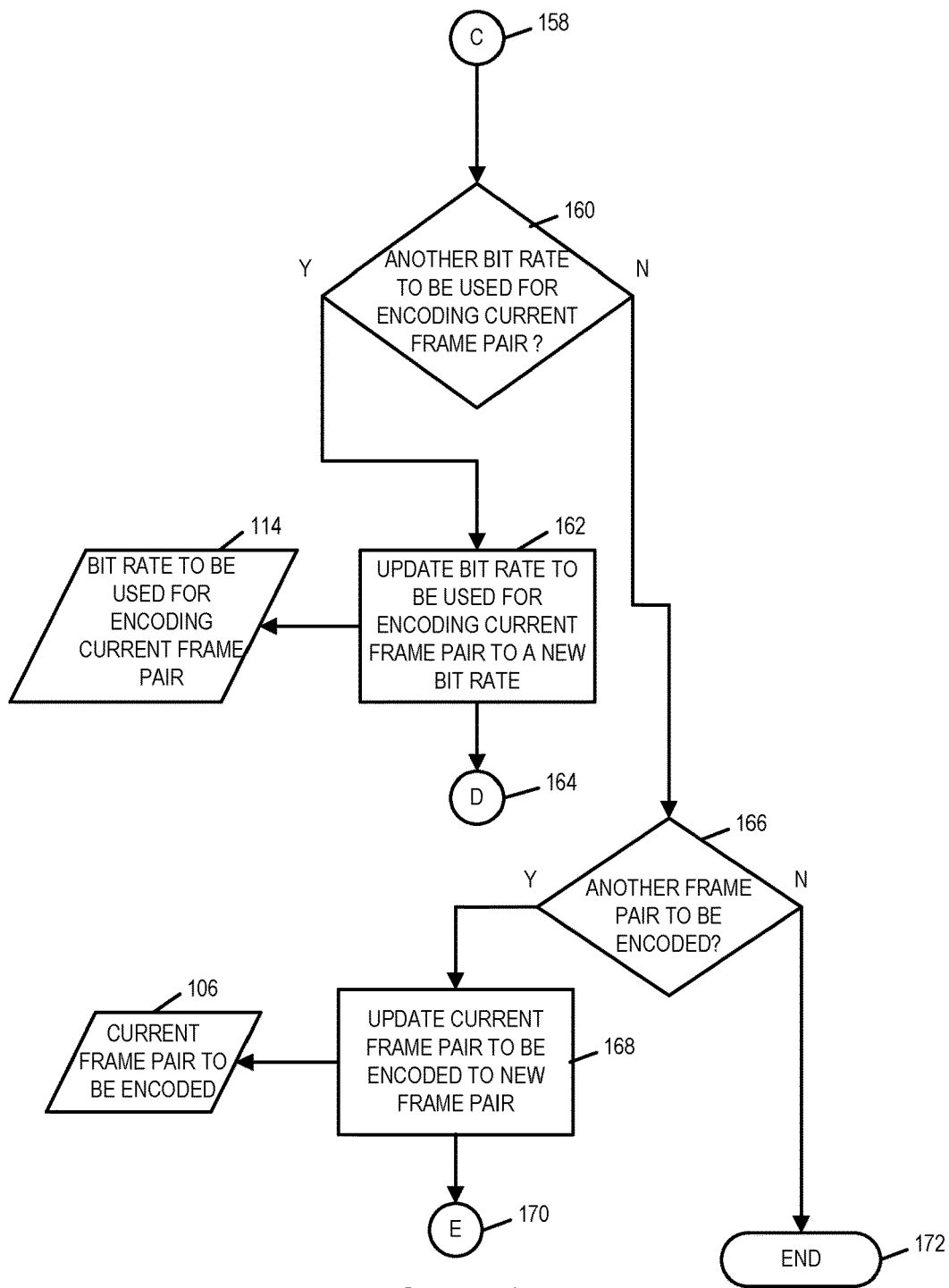
FIG. 1D is a fourth portion of a flowchart of an exemplary method of processing image data, e.g., stereoscopic frame pairs of image data, in accordance with an exemplary embodiment.
FIG. 1 comprises the combination of FIG. 1A, FIG. 1B, FIG. 1C and FIG. 1D.

FIG. 1, comprising the combination of FIG. 1A, FIG. 1B, FIG. 1C and FIG. 1D, is a flowchart 100 of an exemplary method of processing image data in accordance with an exemplary embodiment. The exemplary method of flowchart 100 may be performed by a computer system, e.g., computer system 300 of FIG. 3.

Operation of the exemplary method starts in step 102, in which the computer system is powered on and initialized. Operation proceeds from step 102 to step 104, in which the computer system receives a current frame pair to be encoded, as represented by information 106. The current frame pair to be encoded is a frame pair of stereoscopic image. Operation proceeds from step 104 to step 108 in which the computer system receives control input. The control input includes a maximum parallel offset reduction permitted (M) 110, a list of supported bit rates including a maximum bit rate (MAXBR) and a minimum bit rate (MINBR) 112, and a bit rate to be used for encoding the current frame pair (current bit rate) 114. In various embodiments, MINBR is the minimum bit rate which corresponds to mono encoding. In some embodiments, there are a plurality alternative predetermined bits rates including multiple alternative bit rates which can be used for stereo encoding. In some embodiments, there are a plurality alternative predetermined bits rates including multiple alternative bit rates which can be used for stereo encoding and a minimum bit rate corresponding to mono encoding. Operation proceeds from step 108 to step 116.

In step 116 the computer system sets the bit rate to be used for encoding content, e.g., frame pairs, to get the bit rate to be used. Operation proceeds from step 116 to step 118. In step 118 the computer system determines if the bit rate to be used for the current frame pair is greater than the lowest bit rate. If the bit rate to be used for the current frame pair is not greater than the lowest bit rate, then operation proceeds from step 118 to step 120, in which the encoding mode is set to mono. Operation proceeds from step 120, via connecting node A 124, to step 144.

Returning to step 118, if the bit rate to be used for the current frame pair is greater than the lowest bit rate, then operation proceeds from step 118 to step 122. In step 122 the computer system identifies objects in the frame pair. Operation proceeds from step 122, via connecting node B 126, to step 128. In step 128 the computer system determines if the frame pair includes an object in negative parallax, e.g., an object above a predetermined size, in negative parallax. If the computer system determines that the frame pair does not include an object in negative parallax, then operation proceeds from step 128 to step 130, in which the computer system makes a decision not to perform parallax reduction, i.e., the amount of negative parallax reduction to be performed is zero. Operation proceeds from step 130 to step 140.

Returning to step 128, if the computer system determines that the frame pair includes an object in negative parallax, then operation proceeds from step 128 to step 132. In step 132 the computer system identifies the closest object, e.g., over a predetermined size, in the frame with negative parallax, e.g., closest as perceived relative to camera and thus viewer. Operation proceeds from step 132 to step 134, in which the computer system determines a value for D, wherein D is the parallax difference of the identified object. Operation proceeds from step 134 to step 136. In step 136 the computer system determines the amount of negative parallax reduction to be performed as a function of an encoding data rate to be used for encoding, e.g., determines a parallax reduction offset (PROS) as a function of the current bit rate. In some embodiments, determining an amount of negative parallax reduction determines a greater amount of negative parallax reduction when said encoding data rate to be used is a first encoding data rate than when a second encoding data rate is used which is higher than said first data rate to be used. In various embodiments, the determining an amount of negative parallax reduction is based on the determined parallax difference in the identified closet object in the frame pair with negative parallax as well as the encoding data rate to be used, e.g., the amount of negative parallax reduction is a function of the current bit rate and the parallax difference D of the identified object. In some embodiments, PROS=((min (D, M))/M)*R, where R=1−(current bit rate/MBR).

Operation proceeds from step 136 to step 138. In step 138, the computer system determines if PROS is greater than zero, and controls operation as a function of the determination. If PROS is not greater than zero, then operation proceeds from step 138 to step 140, in which the computer system sets the encoding mode to encode stereo without parallax reduction, i.e., set parallax reduction effect to 0. Operation proceeds from step 140, via connecting node A 124, to step 144.

Returning to step 138, if the computer system determines that PROS is greater than zero, then operation proceeds from step 138 to step 142. In step 142 the computer system sets the encoding mode to encoding with negative parallax reduction. Operation proceeds from step 142, via connecting node A 124, to step 144.

In step 144 the computer system encodes the current frame pair based on the determined encoding mode. Step 144 includes steps 146, 148, 150, 152, and 154. In step 146 the computer system determines if the encoding mode is set to mono, e.g., encode using a single frame of the current frame pair. If the encoding mode is mono, then operation proceeds from step 146 to step 150, in which the computer system encodes the frame pair using mono frame encoding. Returning to step 146, if the computer system determines that the encoding mode is not mono, then operation proceeds from step 146 to step 148. In step 148 the computer system determines if the encoding mode is set to encode stereo without parallax reduction. If the encoding mode is set to encode stereo without parallax reduction, then operation proceeds from step 148 to step 154. Returning to step 148, if the computer system determines that the encoding mode is not set to encode stereo without parallax reduction, the encoding mode is set to encode stereo with parallax reduction, and operation proceeds from step 148 to step 152. In step 152, the computer system performs negative parallax reduction in the determined amount. In step 152 the computer system performs the determined amount of parallax reduction on the frame pair, e.g., the current input frame pair, to produce a processed a processed frame pair with less negative parallax the frame pair. Operation proceeds from step 152 to step 154. In step 154, the computer system encodes a frame pair in stereo. In step 154 the computer system encodes the frame pair, which was previously processed to perform negative parallax reduction if step 152 was performed, in stereo. Thus, in step 154, if step 152 was performed, the computer system encodes the processed frame pair output of step 152 at the encoding data rate (current data rate) to be used for encoding the frame pair. However, if the encoding mode is set to encode stereo without parallax reduction, then in step 154 the computer system encodes a current frame, which has not been subjected to negative parallax reduction, at the encoding data rate (current data rate) to be used for encoding the frame pair in stereo.

Operation proceeds from step 144 to step 156, in which the computer system outputs and/or stores the encoded data corresponding to the frame pair. Operation proceeds from step 156, via connecting node C 158, to step 160.

In step 160, the computer system determines if another bit rate is to be used for encoding the current frame pair. If another bit rate is to be used for encoding the current frame pair, then operation proceeds from step 160 to step 162. In step 162, the computer system updates the bit rate to be used for encoding the current frame pair to a new bit rate, changing the value of the bit rate to be used for encoding the current frame pair 114. Operation proceeds from step 162, via connecting node D 164 to step 108.

Returning to step 160, if the computer system determines that another bit rate is not to be used for encoding the current frame pair, then operation proceeds from step 160 to step 166, in which the computer system determines if another frame pair is to be encoded. If the computer system determines that another frame pair is to be encoded, then operation proceeds from step 166 to step 168 in which the computer system updates the current frame pair to be encoded to a new frame pair. Thus current frame pair to be encoded 106 is updated, e.g., replaced with a next frame pair in a sequence of frame pairs. Operation proceeds from step 168, via connecting node E 170, to step 104.

Returning to step 166, if the computer system determines that there is not another frame pair to be encoded then, operation proceeds from step 166 to step end step 172.

In one example, the same input frame pair, e.g., current frame pair to be encoded 106, is subjected to processing and encoding using three different data rates, a first encoding data rate, a second data encoding rate, and a third data encoding rate. Thus in different iterations of step 108, the received control input of current bit rate to be used for encoding the current frame pair 114 is set to three different values. For example, the first and second encoding data rates correspond to stereo encoding, which may, and sometimes does, include negative parallax reduction as part of the processing, and the third data rate which is a lowest supported data rate corresponds to a mono encoding method in which a single image is encoded for the frame pair which included left and right eye images. In some such embodiments, the frame pair to be encoded is processed using the first data rate and the processing includes a first amount of parallax reduction, and the resulting processed frame pair is then encoded at the first data rate; the frame pair to be encoded is also processed using a second data rate, said second data rate being higher than said first data rate, and the processing corresponding to the second data rate including performing a second amount of parallax reduction which is less than said first amount of parallax reduction, and the resulting processed frame pair is encoded at the second encoding data rate. In some such embodiments, the processing using the third data rate, which corresponds to the lowest data rate and corresponds to mono includes selecting one of the right and left input eye images to encode, and encoding the selected one eye image at the third data rate.

Figure 2:
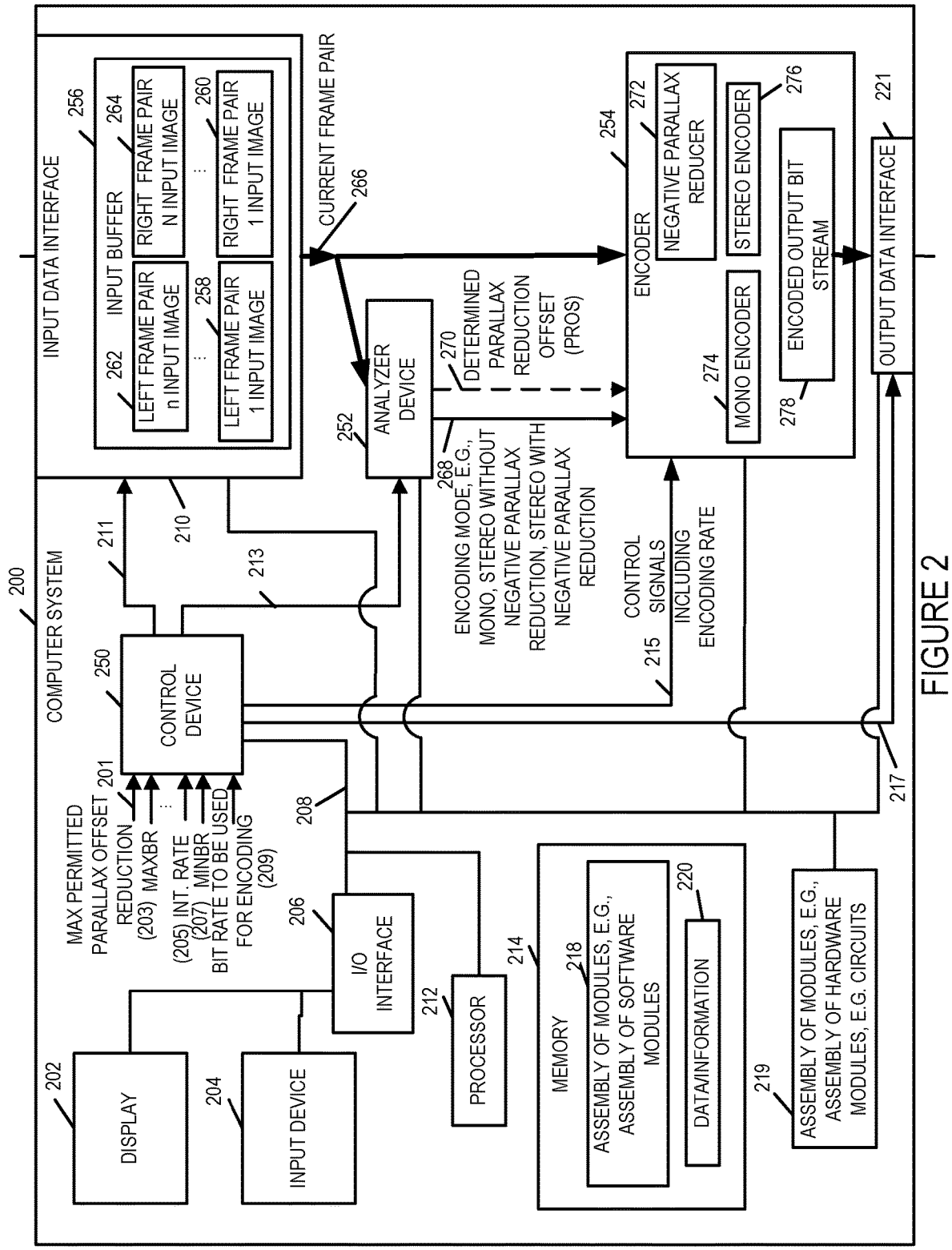
FIG. 2 illustrates an exemplary computer system, implemented in accordance with an exemplary embodiment which may implement the flowchart of FIGS. 1A-1D.

FIG. 2 illustrates a computer based encoding and content delivery system 200 implemented in accordance with the present invention. The system 200 includes a display 202, input device 204, input/output (I/O) interface 206, a processor 212, an input data interface 210, e.g., a first network interface, an output data interface 221, e.g., a second data interface, an assembly of modules 219, e.g., assembly of hardware modules, e.g. assembly of circuits, a memory 214, a control device 250, an analyzer device 252, and an encoder 254, coupled together via bus 208 over which the various elements may interchange data and information. The memory 216 includes an assembly of modules 218, e.g., assembly of software modules e.g., routines, and data/information 220. In some embodiments, modules 218 when executed by the processor 212 control the computer system 200 to implement one or more steps of the exemplary method which have been described, e.g., with regard to flowchart 100 of FIG. 1. In some embodiments, modules 219 control the computer system 200 to implement one or more steps of the exemplary method which have been described, e.g., with regard to flowchart 100 of FIG. 1. In some embodiments, one or more of all of control device 250, input data interface 210, analyzer device 252, encoder 254 and output data interface 221 implements one of more steps of the exemplary method which has been described, e.g., with regard to flowchart 100 of FIG. 1.

Control device 250 receives a maximum parallax offset reduction 201, a list of supported bit rates corresponding to encoder 254 including a maximum bit rate (MAXBR) 203, and intermediate bit rate (INT. RATE) 205, and a minimum bit rate (MINBR) 207. Control device 250 also receives a bit rate to be used for encoding (current bit rate) 209, e.g., for encoding a current frame pair. In some embodiments, the bit rate to be used for encoding is a function of one or more of all of: current channel condition of the communications channel over which the output bit stream is to be communicated, type of connection, e.g., wireless, wired, fiber optic, a subscriber guaranteed rate, type of device receiving the encoded bit stream. Control device 250 sends control signals 211 to input data interface 210, e.g., to control the input data interface 210 to receive stereoscopic image pairs and/or to forward a current frame image pair to analyzer 252 and/or to encoder 254. Control device 250 sends control signals 213 to analyzer device 252 to control the analyzer device 252 to receive and analyze an image pair. Control device 250 also forwards control data to analyzer device 252, which is to be used in the analysis including, e.g., maximum permitted offset reduction and a minimum bit rate. Control device 250 sends control signals 215 to encoder 254 to control the operation of the encoder. Control signals 254 include a bit rate to be used for encoding. Control device sends control signals 217 to output data interface 221 to control the output interface to output an encoded output bit stream 278.

Input data interface 210 includes an input buffer 256. Input buffer 256 includes a plurality of received stereoscopic image frame pairs (left frame pair 1 input image 258, right frame pair 1 input image 260), . . . (left frame pair n input image 262, right frame pair n input image 264). Current frame pair 266 is output from input data interface 210 and input to and processed by analyzer device 252 and encoder 254.

Analyzer device 252 identifies objects in a current image frame pair, determines if the frame pair includes an object in negative parallax, e.g., above a predetermined size, identifies a closed object, e.g., above a predetermined size, with negative parallax, determines a parallax difference in the identified closest object in the frame pair with negative parallax, determines an amount of negative parallax reduction to be performed, e.g., a PROS value, and determines if PROS is greater than zero. In some embodiments, analyzer device 252 determines when a frame pair to be encoded includes an object in negative parallax, an amount of negative parallax reduction to be performed as a function of an encoding data rate to be used for encoding. In some such embodiments, analyzer device 252 determines a greater amount of negative parallax reduction to be performed when the encoding data rate to be used is a first encoding data rate than when a second encoding data rate which is higher than said first data rate is to be used. In some embodiments, analyzer device 252 determines the amount of parallax reduction to be performed based on the determined difference in the identified closet object in the frame pair with negative parallax as well as the encoding data rate to be used. In some such embodiments, PROS=((min (D, M))/M) *R, where R=1−(current bit rate/MBR), and analyzer device 254 determines PROS. Note that for the same input frame pair being processed, different values are PROS are determined by analyzer device 253, corresponding to different current bit rates to be used for encoding.

Analyzer device 252 also sets the encoder mode, e.g., to one of mono mode, stereo encoding without negative parallax reduction, or stereo encoding with negative parallax reduction. Analyzer device 252 outputs a determined encoding mode signal 268 to encoder device 254. Analyzer device 252 may, and sometimes does, output a determined parallax reduction offset (PROS) value 270 to encoder 254.

Encoder 254, encodes the current frame pair 266 in accordance with: i) the selected encoding rate, e.g., communicated in signals 215, ii) the determined encoding mode 268, and, when the mode is stereo with negative parallax reduction, iii) the determined parallax reduction offset. Encoder 272 includes a negative parallax reducer 272. Negative parallax reducer 272 performs the determined amount of negative parallax reduction on the input frame pair to be processed to produce a processed frame pair with less negative parallax than the input frame pair. The amount a negative parallax reduction applied by negative parallax reducer 272 is a function of the encoding data rate to be used. Negative parallax reducer 272 performs a second amount of negative parallax reduction which is less than a first amount of parallax reduction when processing a frame pair to be encoded at a second encoding data rate which is higher than a first encoding data rate. Thus, when negative parallax reduction is to be performed, higher encoding data rates correspond to lower amounts of negative parallax reduction. In some embodiments, the negative parallax reducer performs shifts of the left and right eye images, with the amount of shift being a function of the determined PROS. Encoder 254 further includes a mono encoder 274 and a stereo encoder 276. Mono encoder 274 encodes a current frame pair using a mono encoding method in which a single image is encoded for the frame pair at the encoding rate to be used for mono, e.g., the lowest supported data rate. In some embodiments, one of the left and right eye images, e.g., the right eye image of the input frame pair, is selected for encoding in mono. Stereo encoder 276 encodes a frame pair at the ending data rate to be used for the frame pair. If the frame pair was subjected to negative parallax reduction by negative parallax reducer, and the encoding mode is stereo with parallax reduction, then the stereo encoder encodes the processed frame pair output from negative parallax reducer 272 at the encoding data rate to be used for encoding. In some embodiments, the stereo encoder uses differential encoding. In some embodiments, a performed parallax reduction on a frame pair being processed may, and sometimes does, have the added benefit of reducing the amount of bits to be encoded for a frame. Encoded output bit stream 278 is an output from the encoder 254, e.g., an output from mono encoder 274 or stereo encoder 276, e.g., depending upon the current selected mode of operation.

The operator may control one or more input control parameters, e.g., a maximum parallax offset reduction permitted, a list of supported bit rates, and a bit rate to be used for encoding the frame pair, via input device 204, and/or select between alternative input frame pair streams to be encoded, e.g., in an embodiment in which the input data interface may receive alternative input streams. The frame pair stream to be encoded is received via input data interface 210, e.g., a network interface and the encoded output stream is transmitted via output data interface 221, e.g., another network interface. The various components of the computer system 200 are coupled together via bus 208 which allows for data to be communicated between the components of the system 200.

Figure 3:
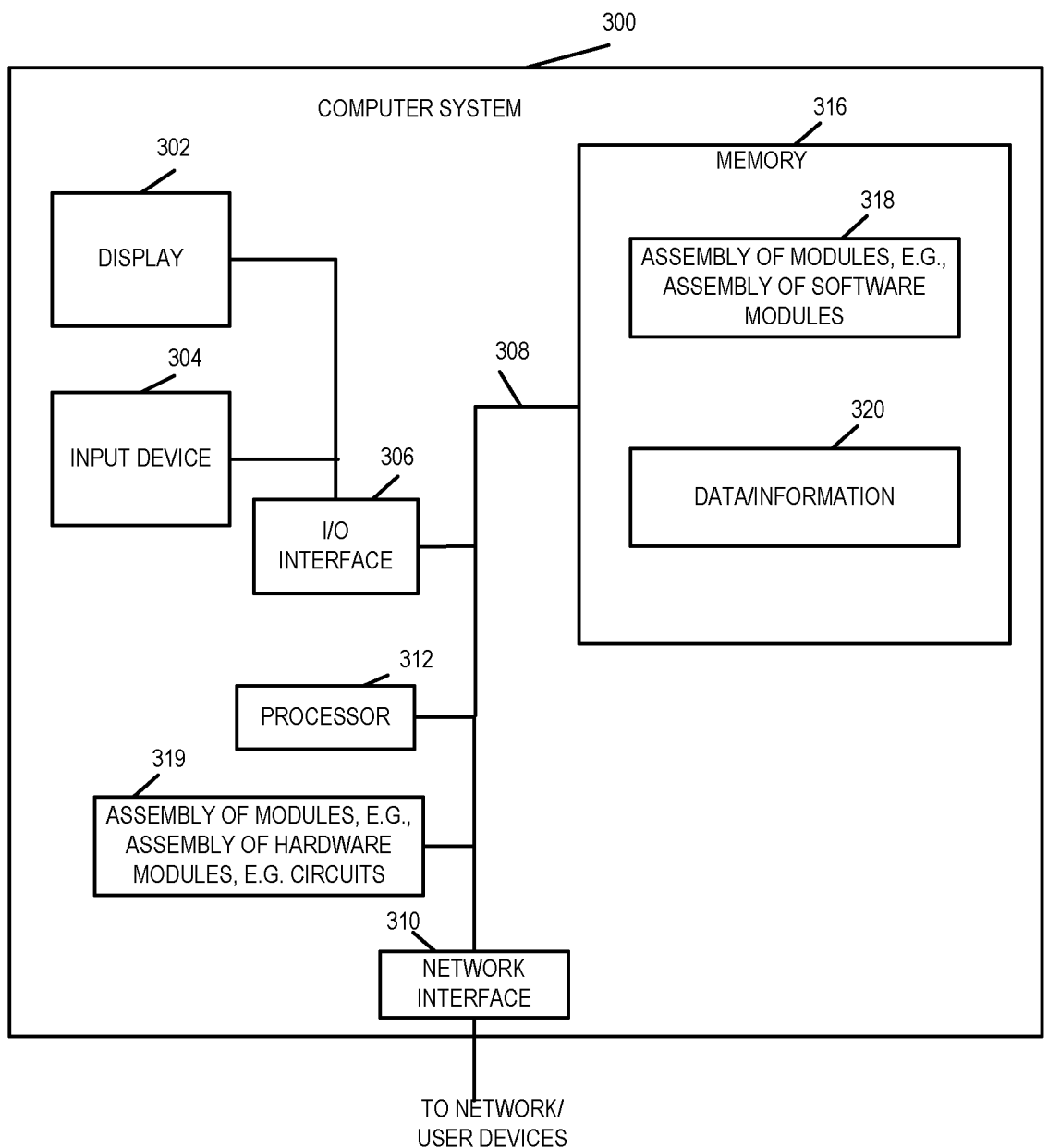
FIG. 3 illustrates another exemplary computer system, implemented in accordance with an exemplary embodiment which may implement the flowchart of FIGS. 1A-1D.

FIG. 3 illustrates a computer based encoding and content delivery system 300 implemented in accordance with the present invention. In some embodiments, system 300 is an image processing system configured to process stereoscopic image data. The system 300 includes a display 302, input device 304, input/output (I/O) interface 306, a processor 312, network interface 310, an assembly of modules 319, e.g., assembly of hardware modules, e.g. assembly of circuits, and a memory 316. The memory 316 includes an assembly of modules 318, e.g., assembly of software modules e.g., routines, and data/information 320. In some embodiments, modules 318 when executed by the processor 312 control the computer system 300 to implement one or more steps of the exemplary method which have been described, e.g., with regard to flowchart 100 of FIG. 1. In some embodiments, modules 319 control the computer system 300 to implement one or more steps of the exemplary method which have been described, e.g., with regard to flowchart 100 of FIG. 1.

The operator may control one or more input control parameters, e.g., a maximum parallax offset reduction permitted, a list of supported bit rates, and a bit rate to be used for encoding the frame pair, via input device 304, and/or select between alternative input frame pair streams to be encoded. In some embodiments, the frame pair stream to be encoded is received via network interface 310 and the encoded output stream is transmitted via network interface 310. The various components of the computer system 300 are coupled together via bus 308 which allows for data to be communicated between the components of the system 300.

In some embodiments, processor (312) is configured to: determine if a frame pair to be encoded includes an object in negative parallax; and determine, when a frame pair to be encoded includes an object in negative parallax, an amount of negative parallax reduction to be performed as a function of an encoding data rate to be used for encoding. In some such embodiments, processor (312) is configured to: determine a greater amount of negative parallax reduction when said encoding data rate to be used is a first encoding rate than when a second encoding data rate which is higher than said first data rate is to be used, as part of being configured to determine an amount of negative parallax reduction. In various embodiments, processor (312) is further configured to: identify a closest object in the frame pair with negative parallax; and determine a parallax difference in the identified closest object in the frame pair with negative parallax. In some embodiments, processor (312) is configured to: determine the amount of parallax reduction to be performed, based on the determined parallax difference in the identified closest object in the frame pair with negative parallax as well as the encoding data rate to be used, as part of being configured to determine the amount of negative parallax reduction to be performed. In some embodiments, processor (312) is further configured to: perform the determined amount of negative parallax reduction on the frame pair to produced a processed frame pair with less negative parallax than said frame pair; and encode the processed frame pair at the encoding data rate to be used for encoding the frame pair. In various embodiments, processor (312) is further configured to: process the frame pair to be encoded using the second encoding data rate which is higher than said first encoding data rate, wherein processing the frame pair to be encoded at the second data rate includes performing a second amount of negative parallax reduction which is less than said first amount of parallax reduction; and encode the frame pair at said second encoding data rate. IN some embodiments, processor (312) is further configured to: encode said frame pair at a lowest supported data rate using a mono encoding method in which a single image is encoded for the frame pair which included left and right eye images.

Figure 4A:
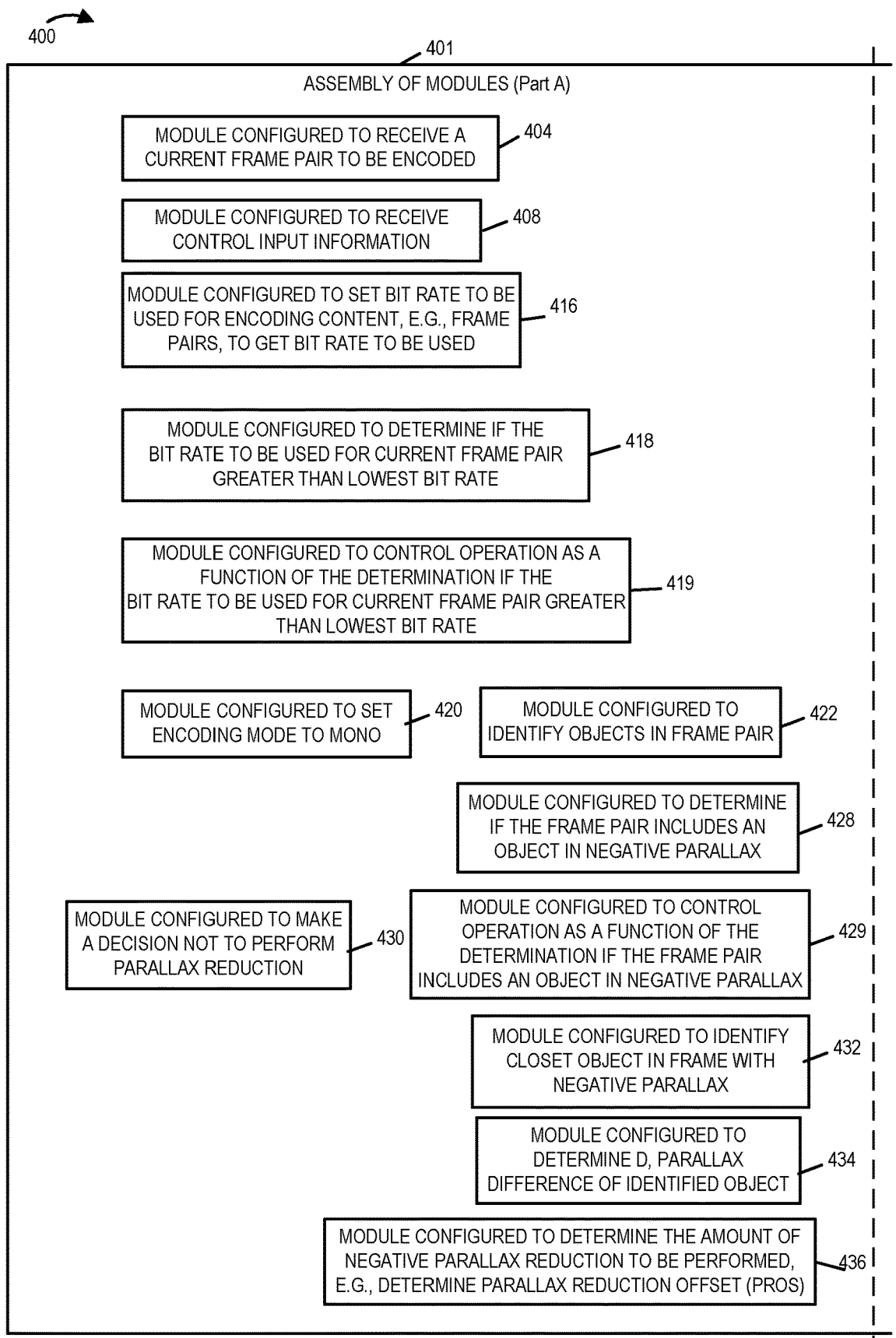
FIG. 4A is a first part of an exemplary assembly of modules which may be included in the computer system of FIG. 2 or FIG. 3 in accordance with an exemplary embodiment.
Figure 4B:
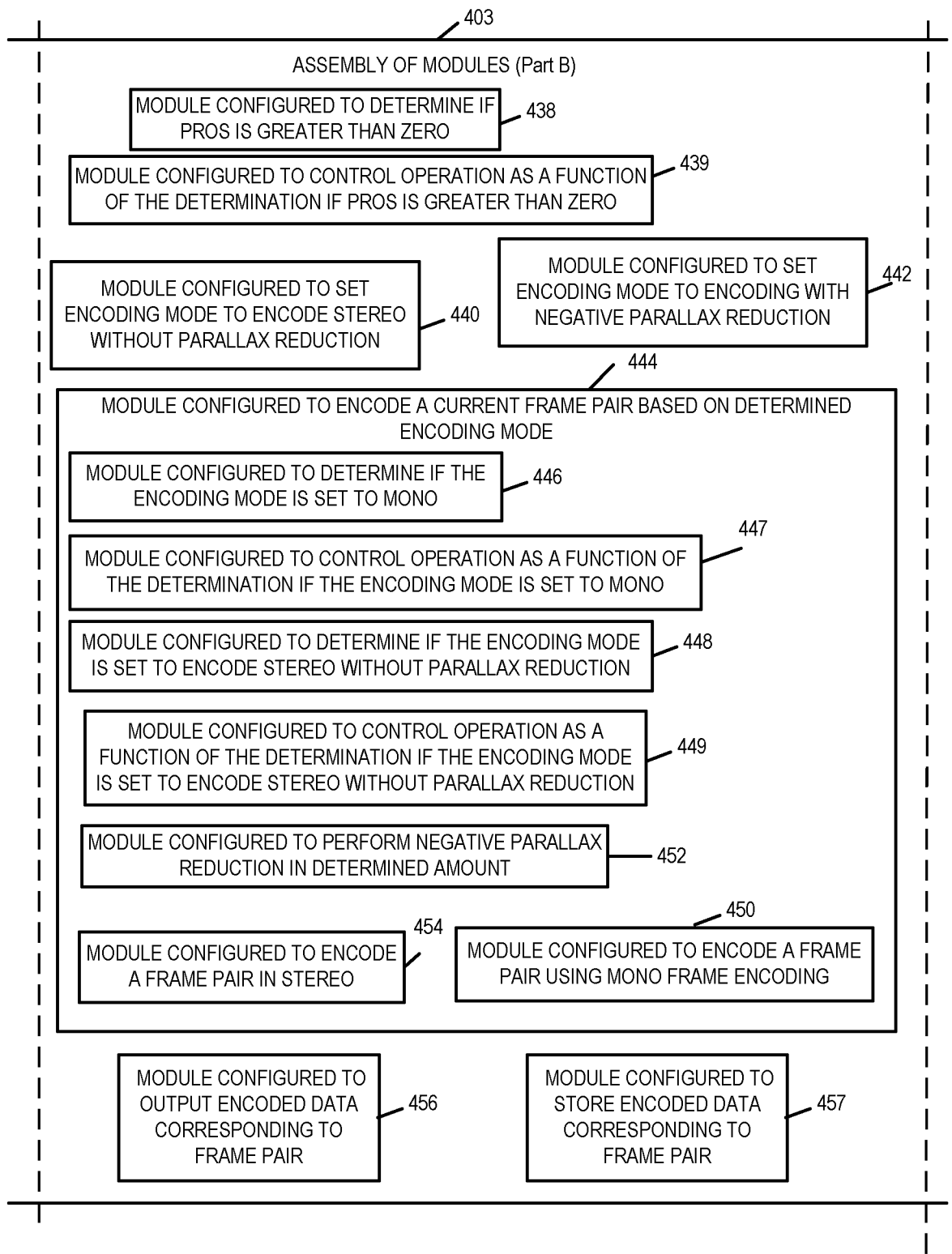
FIG. 4B is a second part of an exemplary assembly of modules which may be included in the computer system of FIG. 2 or FIG. 3 in accordance with an exemplary embodiment.
Figures 4, 4C:
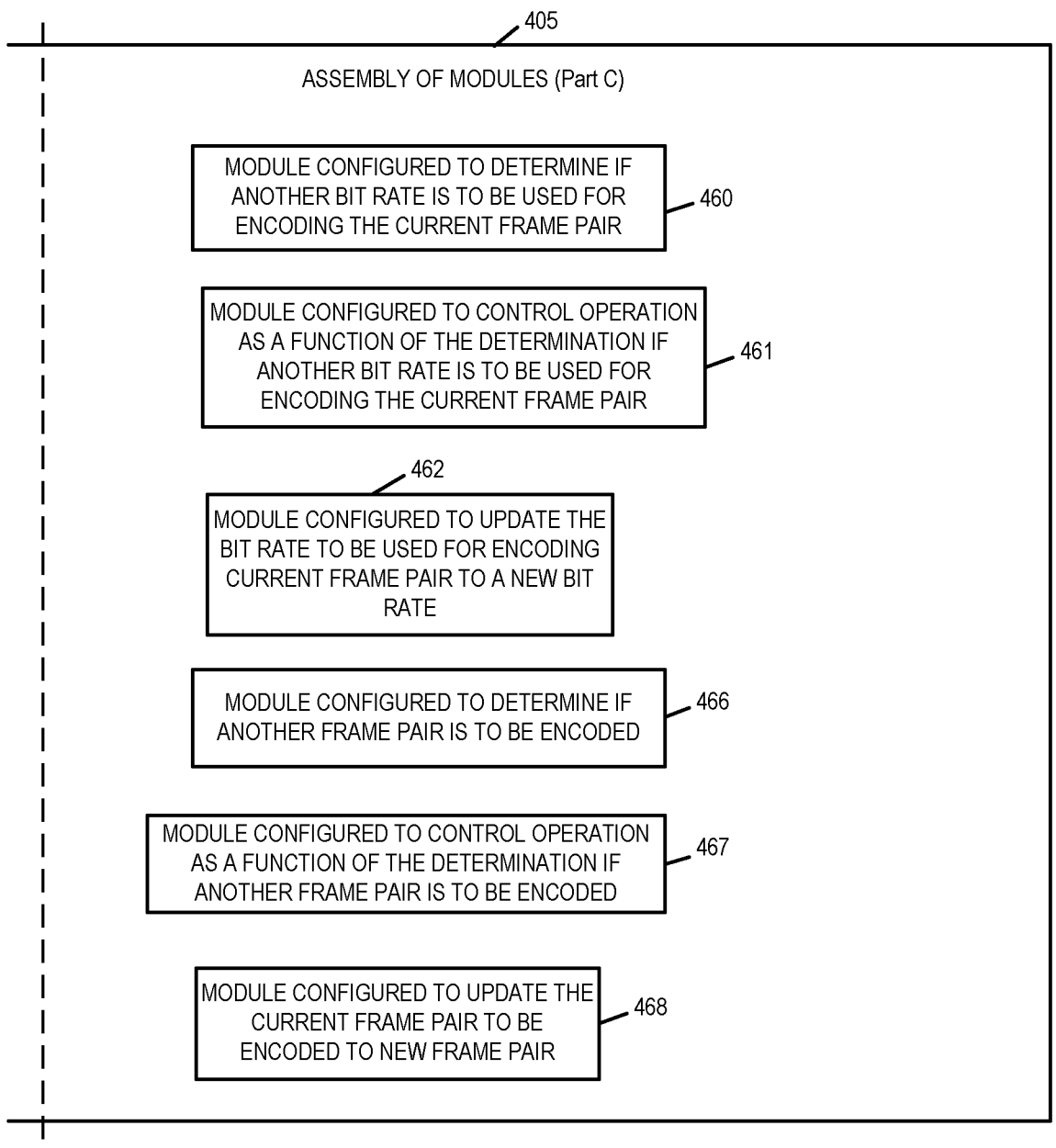
FIG. 4C is a third part of an exemplary assembly of modules which may be included in the computer system of FIG. 2 or FIG. 3 in accordance with an exemplary embodiment.
FIG. 4 comprises the combination of FIG. 4A, FIG. 4B and FIG. 4C.

FIG. 4, comprising the combination of FIG. 4A, FIG. 4B, and FIG. 4C, is an assembly of modules 400, comprising the combination of Part A 401, Part B 403 and Part C 405, in accordance with an exemplary embodiment. Modules in assembly of modules 400 may be included in assembly of modules 318 in memory 316, in processor 312, and/or in assembly of modules 319 in computer system 300 of FIG. 3. Modules in assembly of modules 400 may be included in assembly of modules 218 in memory 214, in processor 212, in assembly of modules 219, in control device 250, in input data interface 210, in analyzer device 252, in encoder device 254, and/or in output data interface 221 in computer system 200 of FIG. 2.

Assembly of modules 400 includes a module 404 configured to receive a current frame pair, e.g., a current stereoscopic frame pair, to be encoded, a module 408 configured to receive control information, and a module 416 configured to set the bit rate to be used for encoding the content, e.g., frame pairs, to get the bit rate to be used. In some embodiments, the control information includes a maximum parallax offset reduction permitted (M), a list of supported bit rates includes a maximum bit rate (MAXBR) and a minimum bit rate (MINBR), and a bit rate to be used for encoding the current frame pair. In some such embodiments, MINBR is the bit rate used for mono encoding. In some embodiments, there are a plurality of alternative, e.g., predetermined alternative, bit rates that may be used for encoding including multiple alternative bit rates corresponding to stereo encoding.

Assembly of modules 400 further includes a module 418 configured to determine if the bit rate to be used for the current frame pair is greater than the lowest bit rate, and a module 419 configured to control operation as a function of the determination if the bit rate to be used for the current frame pair is greater than the lowest bit rate, a module 420 configured to set the encoding mode to mono, e.g., in response to a determination that the bit rate to be used for encoding the current frame pair is not greater than the lowest bit rate. Assembly of module 400 further includes a module 422 configured to identify objects, e.g., above a predetermined size, in the current frame pair, e.g., in response to a determination that the bit rate to be used for encoding the current frame pair is greater than the lowest bit rate.

Assembly of modules 400 further includes a module 428 configured to determine if the current frame pair includes an object, e.g., above a predetermined size, in negative parallax, and a module 429 configured to control operation as a function of the determination if the current frame pair includes an object in negative parallax. Assembly of modules 400 further includes a module 430 configured to make a decision not to perform parallax reduction, e.g., in response to a determination that the frame pair does not include an identified object in negative parallax. Assembly of modules 400 further includes a module 432 configured to identify the closest, e.g., closest as perceived relative to the camera and thus the viewer, object, e.g., above a predetermined size, in the current frame pair with negative parallax, e.g., in response to a determination that the current frame pair includes an identified object with negative parallax. Assembly of modules 400 further includes a module 434 configured to determine D, wherein D is the parallax difference of the identified closet object with negative parallax. Assembly of modules 400 further includes a module 436 configured to determine the amount of negative parallax reduction to be performed, e.g., determine a parallax reduction offset (PROS). In various embodiments, module 436 determines the amount of negative parallax reduction to be performed as a function of an encoding data rate to be used for encoding. In various embodiments, module 436 determines a greater amount of negative parallax reduction when said encoding data rate to be used is a first encoding data rate than when a second encoding data rate which is higher than said first data rate is to be used. In some embodiments, module 436 determines the amount of negative parallax reduction to be performed based on the determined parallax difference (D) in the identified closet object in the frame pair with negative parallax as well as the encoding data rate to be used. In some embodiments, module 436 determines PROS as a function of the determined parallax difference (D) of the identified object, the maximum parallax offset reduction permitted (M), the current bit rate, and the minimum bit rate (MBR). In some such embodiments, PROS=((min (D, M))/M)*R, where R=1−(current bit rate/MBR).

Assembly of modules 400 further includes a module 438 configured to determine if the parallax reduction offset (PROS) is greater than zero, and a module 439 configured to control operation as a function of the determination if the parallax reduction offset (PROS) is greater than zero. Assembly of modules 400 further includes a module 440 configured to set the encoding mode to encode stereo without parallax reduction, e.g. in response to a determination that PROS is not greater than zero, and a module 442 configured to set the encoding mode to encoding with negative parallax reduction, e.g., in response to a determination that PROS is greater than zero.

Assembly of modules 400 further includes a module 444 configured to encode the current frame pair based on the determined encoding mode. Module 444 includes modules 446, 447, 448, 449, 452, 454 and 450. In various embodiments, one or more or all of modules 446, 447, 448, 449, 452, 454 and 450, are included as separate modules outside of module 444. Module 446 is a module configured to determine if the encoding mode is set to mono, and module 447 is a module configured to control operation as a function of the determination if the encoding mode is set to mono. Module 448 is a module configured to determine if the encoding module is set to encode stereo with parallax reduction, and module 449 is a module configured to control operation as a function of the determination if the encoding mode is set to encode stereo without parallax reduction. Module 452 is a module configured to perform negative parallax reduction in the determined amount, e.g., in response to a determination that that the encoding mode is not set to mono and not set to encode stereo without parallax reduction, e.g., the encoding mode is set to encode stereo with parallax reduction. The determined amount if parallax reduction used by module 452 is an output of module 436. Module 452 performs the determined amount of negative parallax reduction on an input frame pair being processed to produce a processed frame pair with less negative parallax than the input frame pair. Module 452 may, and sometimes does, process an input frame pair multiple times, corresponding to different encoding data rates to be used, with different amount of negative parallax reduction being applied. For example, module 452 may process an input frame pair corresponding to two different encoding data rates to be used to encode the processed frame pair, wherein the second encoding data rate is higher than the first encoding data rate, and module 452 performs a second amount of parallax reduction corresponding to the second data rate and a first amount of parallax reduction corresponding to the first data rate, wherein the second amount of parallax reduction is less than the first amount of parallax reduction.

Module 454 is a module configured to encode a frame pair in stereo, e.g., at the set bit rate to be used when the encoding mode is stereo without parallax reduction or stereo with parallax reduction. The input to module 454 is the current frame pair or the processed current frame pair which has undergone negative parallax reduction processing by module 454. Module 454, may, and sometimes does encode a processed frame pair, e.g., a processed frame pair which is the result of negative parallax reduction, at the encoding data rate to be used for encoding the frame pair. Module 454, may, and sometimes does encode a frame pair, e.g., a frame pair which has not undergone negative parallax reduction, at the encoding data rate to be used for encoding the frame pair. Module 450 is a module configured to encode a frame pair using mono frame encoding, e.g., when the encoding mode is mono. In some embodiments, module 450 uses one of the two frames of the current frame pair, e.g., the right eye frame, as input to the mono encoding and disregards, e.g., drops, the other frame of the current frame pair. In some embodiments, module 450 encodes a frame pair at a lowest supported rate using a mono encoding method in which a single image is encoded for the frame pair which included left and right eye images.

Assembly of modules 400 further includes a module 456 configured to output encoded data corresponding to a frame pair, and a module 457 configured to store encoded data corresponding to a frame pair.

Assembly of modules 400 further includes a module 460 configured to determine if another bit rate is to be used for encoding the current frame pair, a module 461 configured to control operation as a function of the determination if another bit rate is to be used for encoding the current frame pair. In some embodiments, each frame pair is encoded for a plurality of alternative bit rates, e.g., a plurality of predetermined alternative bit rates. Assembly of modules 400 further includes a module 462 configured to update the bit rate to be used for encoding the current frame pair, e.g., in response to a determination that the current frame pair is to be encoded using another bit rate.

Assembly of modules 400 further includes a module 466 configured to determine if another frame pair is to be encoded, a module 467 configured to control operation as a function of the determination if the another frame pair is to be encoded, and a module 468 configured to update the current frame pair to be encoded to a new frame pair, e.g., a next frame pair in a sequence of stereoscopic frame pairs.

In various embodiments, the bit rate used can be, and sometimes is, changed dynamically as different frame pairs are processed, e.g., with different frame pairs in a sequence of frame pairs undergoing different amounts of parallax reduction and/or being encoded at different bit rates. In various embodiments, the encoding may, and sometimes does, dynamically switch between stereo encoding and mono encoding.

Figure 5:
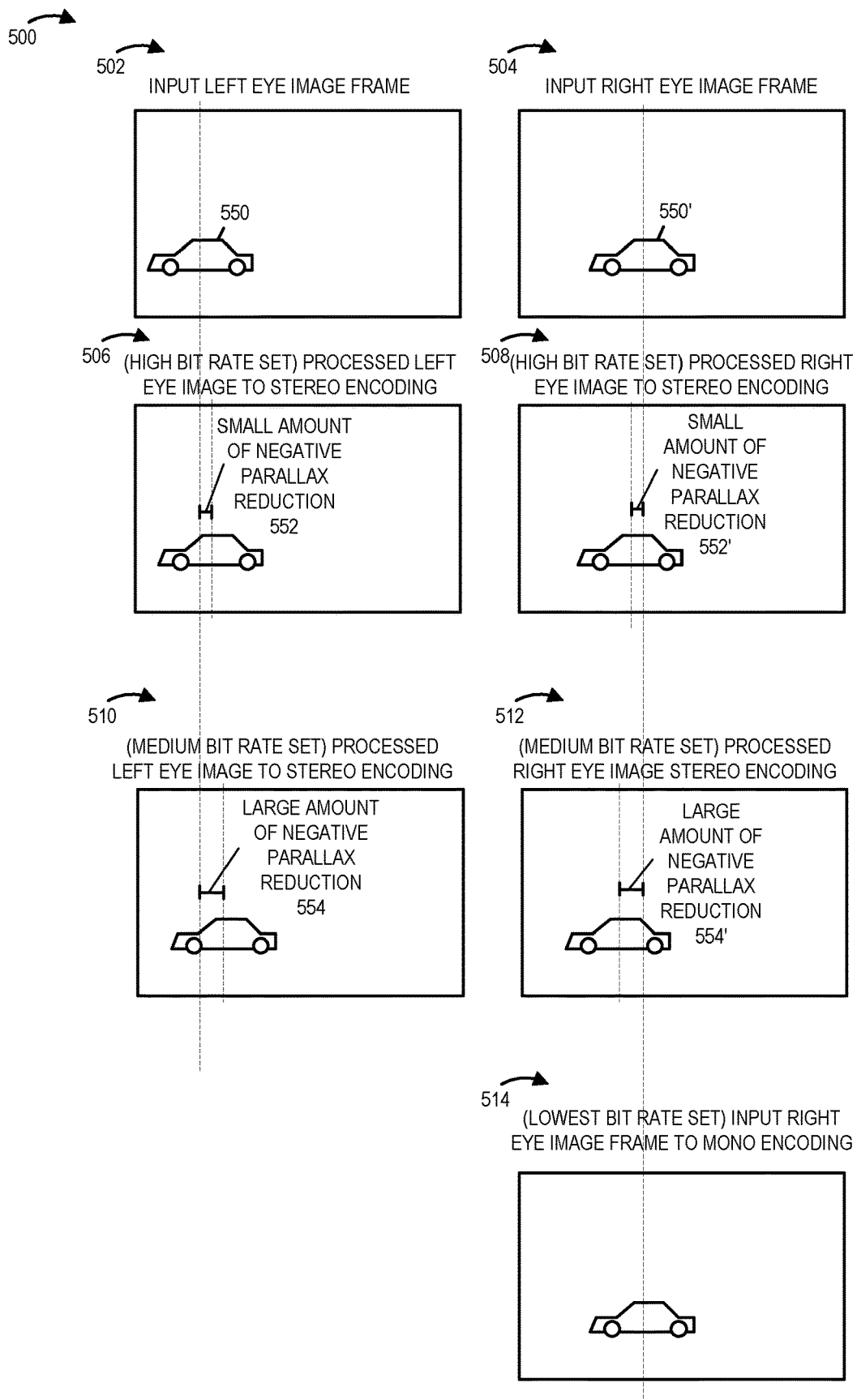
FIG. 5 is a drawing illustrating different amount of negative parallax reduction corresponding to different bit rates to be used for encoding in accordance with an exemplary embodiment.

FIG. 5 is a drawing 500 illustrating different amount of negative parallax reduction corresponding to different bit rates to be used for encoding in accordance with an exemplary embodiment. Drawings (502, 504) illustrate an exemplary current frame pair to be encoded including an input left eye frame image 502 and an input right eye frame image 504 in accordance with an exemplary embodiment. A closest identified object, e.g., a car, above a predetermined size in the current frame pair, with negative parallax is indicated as object 550 in the left eye frame and 550' in the right eye frame.

Drawings (506, 508) illustrate an example of processed left and right eye images (506, 508) based on input left and right eye images (502, 504), respectively, in which the bit rate to be used for encoding is set to a high bit rate, which corresponds to stereo encoding. The determined amount of parallax reduction is a small amount of negative parallax reduction which is applied, as indicated by right shift 552 and left shift 552'.

Drawings (510, 512) illustrate an example of processed left and right eye images (510, 512) based on input left and right eye images (502, 504), respectively, in which the bit rate to be used for encoding is set to a medium bit rate, which corresponds to stereo encoding. The determined amount of parallax reduction is a large amount of negative parallax reduction which is applied, as indicated by right shift 554 and left shift 554'.

Drawings 514 illustrate an example of an input image 514 sent for mono encoding based on input left and right eye images (502, 504), respectively. In this example, input image 514 is the same as input right eye image frame 504 and input left eye image 502 is not used. In this example, the lowest encoding bit rate from among a plurality of alternative bit rates is used which maps to mono encoding.

A method in accordance with flowchart 100 of FIG. 1 may be used to decide which one of the 3 alternatives is used for the current input frame pair (502, 504) being processed. In some embodiments, an object may not be identified in the image pair which satisfies the conditions to perform negative parallax reduction, and in such a case negative parallax reduction is not applied to the image pair when performing stereo encoding. The example of FIG. 5 may be performed by a computer system, e.g. computer system 300 of FIG. 3.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a video data processing system. Various embodiments are also directed to methods, e.g., a method of processing video data. Various embodiments are also directed to machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of encoding stereoscopic image data, the method comprising:
   identifying a frame pair to be encoded;
   encoding the frame pair, using a first bit rate, to form first encoded data; and
   encoding the frame pair, using a second bit rate that is lower than the first bit rate, to form second encoded data by:
      identifying an object in the frame pair in negative parallax;
      determining an amount of negative parallax reduction to perform on the object in negative parallax as a function of the second bit rate used to encode the frame pair;
      performing the determined amount of negative parallax reduction on the object; and
      encoding the frame pair using the second bit rate without performing parallax reduction on objects in positive parallax.

2. The method of claim 1, further comprising:
   identifying a second object in negative parallax in the frame pair; and
   determining a parallax difference between the object in the negative parallax in the frame pair and the second object in negative parallax in the frame pair.

3. The method of claim 2, wherein the amount of negative parallax reduction performed is also a function of the parallax difference.

4. The method of claim 1, wherein encoding the frame pair using the first bit rate comprises:
   determining a second amount of negative parallax reduction to perform on the object in negative parallax as a function of the first bit rate, the second amount of negative parallax reduction being less than the amount of negative parallax reduction determined as a function of the second bit rate;
   performing the second amount of negative parallax reduction on the object; and
   encoding the frame pair using the first bit rate.

5. An image processing system for processing stereoscopic image data, the image processing system comprising:
   a processor configured to:
      identify a frame pair to be encoded;
      encode the frame pair, using a first bit rate, to form first encoded data; and
      encode the frame pair, using a second bit rate that is lower than the first bit rate, to form second encoded data by:
         identifying an object in the frame pair in negative parallax;
         determining an amount of negative parallax reduction to perform on the object in negative parallax as a function of the second bit rate used to encode the frame pair;
         performing the determined amount of negative parallax reduction on the object; and
         encoding the frame pair using the second bit rate without performing parallax reduction on objects in positive parallax; and
   memory coupled to the processor.

6. The image processing system of claim 5, wherein the processor is further configured to:
   identify a second object in negative parallax in the frame pair; and
   determine a parallax difference between the object in the negative parallax in the frame pair and the second object in negative parallax in the frame pair.

7. The image processing system of claim 6, wherein the amount of negative parallax reduction performed is also a function of the parallax difference.

8. The image processing system of claim 7, wherein the processor is further configured to:
   transmitting the second encoded data to a playback device.

9. The image processing system of claim 8, wherein said processor is further configured to claim 5, wherein the processor encodes the frame pair using the first bit rate by:
   determining a second amount of negative parallax reduction to perform on the object in negative parallax as a function of the first bit rate, the second amount of negative parallax reduction being less than the amount of negative parallax reduction determined as a function of the second bit rate;
   performing the second amount of negative parallax reduction on the object; and
   encoding the frame pair using the first bit rate.

10. The image processing system of claim 9, wherein said processor is further configured to:
    encode the frame pair using a mono encoding method by:
       selecting a single image from the frame pair; and
       encoding the single image without parallax.

11. A non-transitory computer readable medium including processor executable instructions that, when executed by a processor, control an image processing system to:
    identify a frame pair to be encoded;
    encode the frame pair, using a first bit rate, to form first encoded data; and
    encode the frame pair, using a second bit rate that is lower than the first bit rate, to form second encoded data by:
       identifying an object in the frame pair in negative parallax;
       determining an amount of negative parallax reduction to perform on the object in negative parallax as a function of the second bit rate used to encode the frame pair;
       performing the determined amount of negative parallax reduction on the object; and
       encode the frame pair using the second bit rate without performing parallax reduction on objects in positive parallax.

12. A method of encoding stereoscopic image data, the method comprising:
    identifying a frame pair to be encoded;
    selecting an encoding mode that includes negative parallax reduction;
    identifying an object in the frame pair in negative parallax;
    determining an amount of negative parallax reduction to perform on the object in negative parallax as a function of the bit rate being used to encode the frame pair;
    performing the determined amount of negative parallax reduction on the object; and
    encoding the frame pair using the bit rate without performing parallax reduction on objects in positive parallax.

13. The method of claim 12, wherein determining an amount of parallax reduction includes determining a parallax reduction offset.

14. The method of claim 12, wherein the selected encoding mode includes encoding the frame pair using multiple different bit rates.

15. The method of claim 14, wherein encoding the frame pair using multiple different bit rates includes:
    applying a lower amount of negative parallax reduction on the frame pair when encoding the frame pair using a higher bit rate; and
    applying a higher amount of negative parallax reduction on the frame pair when encoding the frame pair using a lower bit rate.

16. The method of claim 1, wherein:
    identifying an object in negative parallax in the frame pair comprises:
        identifying a closest object in the frame pair; and
        determining whether the closest object is over a predetermined size; and
    determining an amount of negative parallax reduction to perform on the object comprises:
        determining a parallax difference D of the identified closest object; and
        determining the amount of negative parallax reduction to perform as a function of the second bit rate and the determined parallax difference D of the identified closest object.

17. The method of claim 16, wherein the closest object is the object perceived to be closest relative to a viewer.

18. The method of claim 12, wherein:
    identifying an object in negative parallax in the frame pair comprises:
        identifying a closest object in the frame pair;
        determining whether closest object is over a predetermined size; and
    determining an amount of negative parallax reduction to perform on the object comprises:
        determining a parallax difference D of the identified closest object; and
        determining the amount of negative parallax reduction to perform as a function of the second bit rate and the determined parallax difference D of the identified closest object.

* * * * *